Feb. 28, 1950        F. J. VEITCH        2,498,831
PIPE JOINT
Filed Oct. 18, 1947
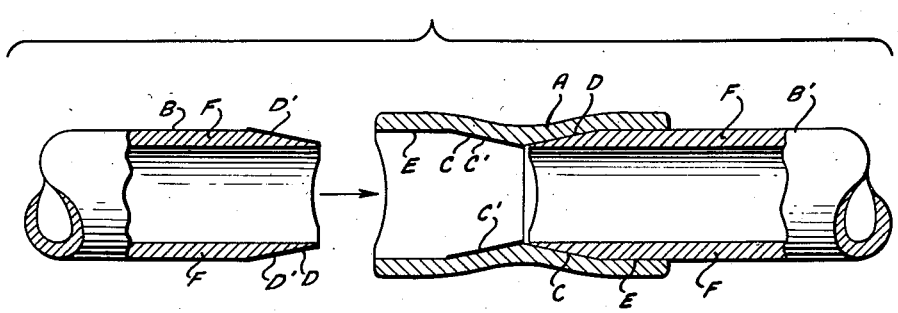
INVENTOR.
BY Frederick J. Veitch Patented Feb. 28, 1950

2,498,831

UNITED STATES PATENT OFFICE 2,498,831

PIPE JOINT

Frederick J. Veitch, Flushing, N. Y.

Application October 18, 1947, Serial No. 780,671

4 Claims. (Cl. 285—161)

This invention relates to a pipe joint for use as a connection means between pipes or tubes with pipe fittings using a solvent or an equivalent adhesive as a sealing means, the invention being particularly adaptable for use with plastic and similar type pipes and pipe fittings.

Some of the chief objects of the invention are:

1st—To provide a pipe joint having a sealing area substantially larger than the cross section area of the pipe wall, whereby stresses tending to separate the united parts will cause a rupture in said pipe in preference to a rupture in said pipe joint.

2nd—To provide a pipe joint using a solvent or equivalent adhesive as a sealing means whereby the pipe can be inserted in a pipe fitting without rubbing or removing the solvent or equivalent adhesive from said pipe joint.

3rd—To provide a pipe joint whereby the pipe fitting snugly engaging the pipe, acts as a jig or a vice locking the pipe joint against displacement during the setting of a solvent or equivalent adhesive used as a sealing means.

While it is not new to use solvents or adhesives as a sealing means in pipe joints, as the ends of pipes prior to the present invention have been butt welded together using a solvent between the ends thereof as a sealing agent, but these butt welded joints have the defects of being weaker than the pipe, and are frequently fractured by the joint being disturbed before the solvent solidifies into a hardened state.

Tubular sleeves having the same inside diameter as the outer wall of the pipe have also been used for the connection of pipes using a solvent there between the pipe and the sleeve as a sealing means, but these sleeve connected joints have the serious defect that the solvent is rubbed from the joint when inserting the pipe into the sleeve as there is no space between the outer wall of the pipe and the inner wall of the sleeve.

The accompanying drawing forming a part of the specification is a longitudinal sectional view showing a sleeve with two broken away ends of pipes, one pipe inserted in the sleeve in accordance with this invention and the other pipe separately spaced by itself away from the sleeve but in line therewith.

Referring to the drawing A is a tubular shaped pipe sleeve, B and B' are broken away ends of pipes or tubes, having a solvent or equivalent adhesive shown by stippled lines C' and D' sprayed or put thereon with a small paint brush before the said pipe B is inserted into the sleeve A.

The pipe B' has been inserted into the sleeve A in accordance with this invention, the inner and outer walls thereof having a 100% wall contact, the solvent used in this joint is not shown in the drawing inasmuch as when it solidifies the united parts become integral and the joint is then only imaginary.

The tapered end D of the pipe B being smaller than the bore E of the sleeve A, the said pipe B can therefore be inserted in the sleeve A without disturbing or removing the solvent C' or D' from the said pipe joint.

The bore E of the sleeve A at the end thereof being the same size as the outer wall of the pipe B' the end of the sleeve A will therefore snugly engage the outer wall of the pipe B' and act as a jig or a vice locking the pipe joint against displacement during the setting or solidifying of the solvent or other adhesive.

The sealing area or the weld portion D of the improved pipe joint being substantially larger than the cross section area of the pipe wall F, and the added strength provided by the enclosing walls of the sleeve A, will give the said pipe joint a strength far in excess to the bursting pressure of the pipe.

While the pipe joint of the invention is shown only in conjunction with a pipe sleeve it is also equally adaptable for use with elbows, T's, and all types of pipe fittings.

The pipe fittings of the invention are preferably injection moulded, and the taper is readily placed on the end of the pipes or tubes with a machine somewhat similar to a wall type pencil sharpener.

This invention having new structure producing new and very useful results never before attained, the allowance of the claims as herewith submitted is therefore respectively requested.

I claim:

1. A pipe joint for use as a connection means between a plastic pipe and a plastic pipe fitting having tubular walls substantially non-collapsible, said pipe fitting having a cone shaped inner wall engaging a tapered end of said pipe, the end of said pipe fitting extending longitudinally from said cone shaped inner wall snugly engages the longitudinal outer wall of said pipe, and having an adhesive sealing means between said engaging walls, whereby the end of said pipe fitting snugly engaging the longitudinal outer wall of said pipe acts as a jig or a vice locking said pipe joint against displacement during the setting or hardening of said adhesive sealing means.

2. A pipe joint between male and female plastic pipe members having substantially non-collapsible tubular walls, said walls having tapered and longitudinal comating surfaces providing an extensively large sealing area having an adhesive therebetween, whereby said extensively large sealing area comprising tapered and longitudinal comating surfaces having an adhesive therebetween provides adhesive strength such that stresses tending to separate the united parts will cause a rupture in said pipe in preference to a rupture in said pipe joint.

3. In combination with a noncollapsible plastic pipe and a noncollapsible plastic pipe fitting having tubular walls, the outer wall of said pipe having substantial engagement with the inner wall of said pipe fitting, and having an adhesive cement providing a sealing means therebetween, the said engaging walls being partly in alignment and partly out of alignment with the outer wall of said pipe, whereby said pipe can be inserted into said pipe fitting without rubbing or removing said adhesive cement from said pipe joint causing a solvent welding between said engaging walls which thereby become substantially integral.

4. A pipe joint between male and female pipe members having noncollapsible tubular walls, said walls having tapered and longitudinal comating surface portions providing an extensively large sealing area proportionately strengthening and increasing the parting resistability of said pipe joint.

FREDERICK J. VEITCH.

REFERENCES CITED

The following references are of record in the file of this patent:

UNITED STATES PATENTS

| Number | Name | Date |
|---|---|---|
| 1,229,175 | Christopherson | June 5, 1917 |
| 1,979,470 | Johnston | Nov. 6, 1934 |